June 30, 1931.   N. TROYER   1,812,385
PACKING FOR SHAFTS
Filed March 28, 1929
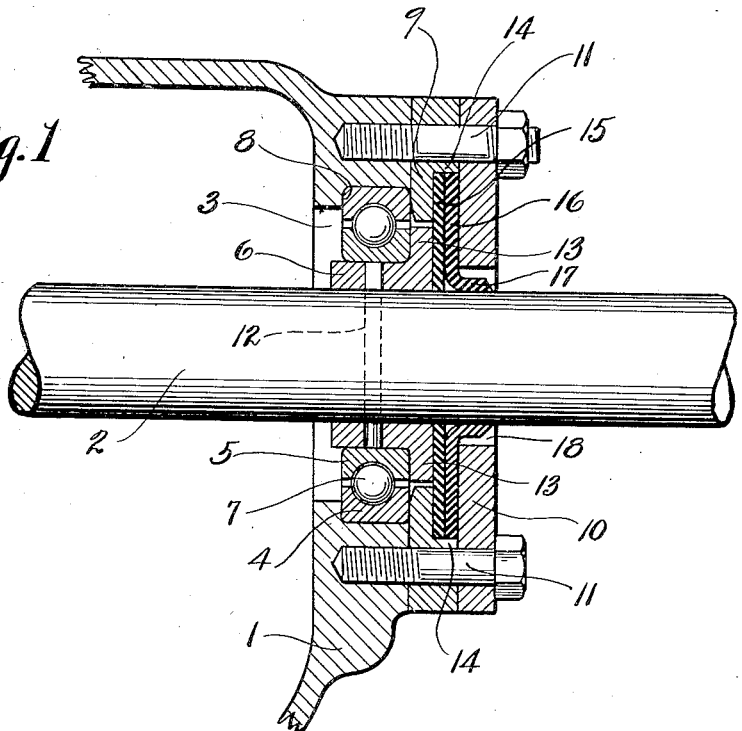
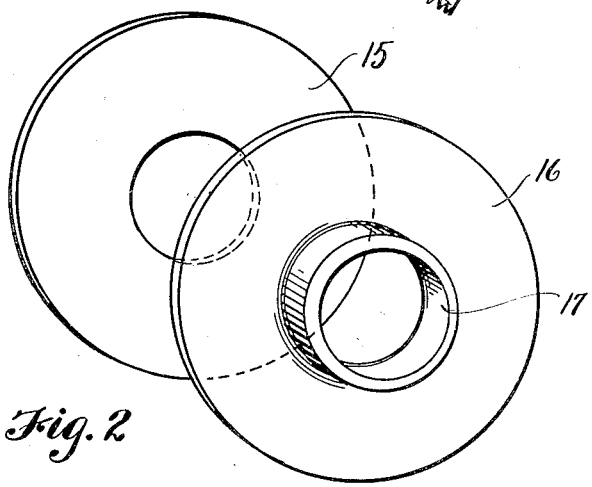
INVENTOR
NELSON TROYER
BY
Cook + Robinson
ATTORNEYS Patented June 30, 1931

1,812,385

UNITED STATES PATENT OFFICE

NELSON TROYER, OF SEATTLE, WASHINGTON, ASSIGNOR TO CONTINENTAL CAN COMPANY, INC., OF NEW YORK, N. Y., A CORPORATION OF NEW YORK

PACKING FOR SHAFTS

Application filed March 28, 1929. Serial No. 350,601.

This invention relates to improvements in shaft packing and has reference in particular to a sealing washer arrangement for use in can vacuumizing machines, or the like, where it is required that certain driving or driven shafts be extended through the walls of the vacuum chamber; the principal object of the present invention being to provide a sealing washer arrangement that will effectively and efficiently seal about the shaft so that no leakage at this point will be possible and which will automatically compensate for any wear that is incident to contact therewith of the rotating shaft or the shaft supporting bearing located at this point.

Other objects of the invention reside in the use of a two-piece arrangement for the purpose of obtaining greater flexibility of the washers to thereby effect better sealing quality without impairing utility of the device.

Other objects of the invention reside in the details of construction and combination of parts as will hereinafter be described.

In accomplishing these objects, I have provided the improved details of construction, the preferred forms of which are illustrated in the accompanying drawings, wherein—

Figure 1 is a sectional detail illustrating the use and construction of a sealing washer arrangement embodied by the present invention.

Figure 2 is a perspective view of the parts of the washer in disassembled relation.

Referring more in detail to the drawings—1 designates what may be a wall portion of a vacuum chamber, or any other chamber or housing where air pressure is greater at one side of the wall than at the other, and 2 designates a revolubly driven shaft that extends through an opening 3 in the wall and which is supported by an anti-friction bearing which, in the present instance, comprises an outer raceway 4 that is seated within the opening 3, an inner raceway 5 that fits about a flanged collar 6 fixed on the shaft, and the ball bearings 7 which operate within grooves provided therefor in the raceways. The raceway 4 seats against a shoulder 8 provided in the opening 3 and has its outer surface flush with the outer face of the wall, and it is held in place by a spacer ring 9 that is fixed to the wall about the opening 3 with its inner peripheral edge portion overlapping the raceway. The spacer ring, in turn, is held securely in place by an overlying clamping ring 10 through which a plurality of bolts 11 are extended into the wall to clamp the parts securely and tightly together; the bolts in this instance extending also through the outer portion of the spacer ring 9.

The collar 6, as shown, is fixed to the shaft by a pin 12, but it is to be understood that it might be turned on the shaft as an integral part thereof. At one end of the collar is an annular flange 13 against which the ball race 5 seats; the inner and outer surfaces of this flange lying in the planes of the inner and outer surfaces of the inner portion of the spacer ring.

At the outer edge of the spacer ring, is an annular, shouldered portion 14 whereby the clamping ring is held spaced from the spacer ring, thereby providing an intermediate groove in which the sealing washers are contained. In its preferred form, the washer assembly comprises a flat inner portion 15, preferably of leather, that seats flatly against the outer face of the collar and spacer and snugly about the shaft 2 and also snugly within the shouldered portion of the spacer 9. Overlying this, is an outer washer 16 which also fits within the shouldered portion of the spacer and is provided closely about the shaft with an outwardly pressed sleeve-like portion 17 which extends within an annular space 18 provided between the shaft and periphery of the opening in the clamping ring through which the shaft extends. The two washers 15 and 16 are clamped tightly together beneath the clamping plate 10.

With this arrangement, it is readily apparent that a lower pressure within the vacuum chamber than that at the outside will have the effect of drawing the outer cup washer inwardly about the shaft to thereby tightly seal the joint. It also causes the outer washer to press inwardly against washer 15 to hold this firmly against the collar and spacer ring so that there can be no leakage between these parts. Any wear on the inner ring because of the rubbing contact therewith of the collar flange 13 is automatically taken up by inward flexing of the two parts.

It is readily apparent that greater flexibility is obtained by the use of the two pieces than by the use of a single piece, and therefore, better sealing is obtained.

Heretofore, the single cup washer 16 was used but was found to be unsatisfactory as many and frequent leaks occurred. Also, the use of a single flat washer, as at 15, was found to be insufficient, but when the two were combined, as shown, a very satisfactory result was obtained. Air pressure against the outer washer holds its sleeve portion tightly about the shaft and also causes it to press inwardly against the inner washer which automatically takes up wear incident to rubbing of the collar, thus at all times maintaining the air sealed joint between the collar and spacer.

Such arrangements are likewise of great service with any machine for holding pressure which might be air, water or other fluid.

Having thus described my invention, what I claim as new therein and desire to secure by Letters Patent, is:

1. The combination with a wall having an opening therein and a shaft extended through the opening, and having an encircling shoulder flush with the opening, of a flat washer fitted about the shaft and seated against the collar and overlapping the wall about the said opening, another washer overlying the first washer and formed with an inwardly yieldable sleeve portion fitted about the shaft and a ring overlying the washers and clamping them to the wall.

2. The combination with a wall having an opening therein, a revolubly driven shaft extended through the opening and a supporting bearing for the shaft fitted within the said opening and including a bearing collar that is fixed to the shaft, of a packing assembly comprising an inner washer fitted about the shaft and bearing against the outer end face of the collar and overlapping the housing about the opening, an outer washer overlying the inner washer and formed with an outwardly directed sleeve portion fitted to the shaft and a ring overlying the washers and clamped to the housing.

3. The combination with a wall having an opening therein, a revolubly driven shaft extended through the opening and a supporting bearing for the shaft seated within the opening, of a packing assembly comprising a collar that is fixed to the shaft, a retaining ring overlying the bearing about the said opening, an inner washer fitted about the shaft and seated against the collar and overlapping the retaining ring, an outer washer that overlies the inner washer and is formed with an outwardly extending sleeve portion fitted to the shaft and a clamping ring encircling the shaft and overlying the said washers and clamped to the housing against the washers.

Signed at Seattle, Washington, this 7th day of March 1929.

NELSON TROYER.